(12) United States Patent
Bjelajac et al.

(10) Patent No.: US 12,103,105 B2
(45) Date of Patent: Oct. 1, 2024

(54) NOZZLE ADAPTER FOR LASER CUTTING HEAD

(71) Applicant: II-VI Delaware, Inc, Wilmington, DE (US)

(72) Inventors: Goran Bjelajac, Berlin (DE); Alexander Müller, Ahrensfelde (DE); Hannes Noack, Ludwigsfelde (DE)

(73) Assignee: II-VI DELAWARE, INC., Wilmington, DE (US)

( * ) Notice: Subject to any disclaimer, the term of this patent is extended or adjusted under 35 U.S.C. 154(b) by 235 days.

(21) Appl. No.: 17/248,542

(22) Filed: Jan. 28, 2021

(65) Prior Publication Data

US 2022/0234138 A1 Jul. 28, 2022

(51) Int. Cl.
*B23K 26/14* (2014.01)
*B23K 26/38* (2014.01)
*B23K 26/70* (2014.01)

(52) U.S. Cl.
CPC .......... *B23K 26/1462* (2015.10); *B23K 26/38* (2013.01); *B23K 26/702* (2015.10)

(58) Field of Classification Search
CPC .. B23K 26/1462; B23K 26/38; B23K 26/702; B23K 26/70
USPC .............................. 219/121.67, 121.6, 121.84
See application file for complete search history.

(56) References Cited

U.S. PATENT DOCUMENTS

| | | | | |
|---|---|---|---|---|
| 5,393,952 A | * | 2/1995 | Yamaguchi | H05H 1/34 219/121.48 |
| 2019/0176263 A1 | | 6/2019 | Ziemann | |
| 2019/0366483 A1 | * | 12/2019 | Bjelajac | H01B 13/067 |
| 2020/0314993 A1 | * | 10/2020 | Günther | B23K 10/00 |

FOREIGN PATENT DOCUMENTS

| | | | | |
|---|---|---|---|---|
| CN | 2097057 U | * | 2/1992 | |
| CN | 204053247 U | | 12/2014 | |
| DE | 4201640 C1 | * | 2/1993 | ............. B23K 26/04 |
| DE | 19719373 C1 | * | 5/1998 | ............. B23K 26/04 |
| DE | 102009024957 B3 | | 9/2010 | |
| DE | 102019108681 A1 | | 10/2020 | |
| JP | S5597957 A | | 7/1980 | |
| JP | 05084579 A | | 4/1993 | |
| JP | H11314187 A | * | 11/1999 | |
| KR | 20140025459 A | | 3/2014 | |

* cited by examiner

*Primary Examiner* — Nathaniel E Wiehe
*Assistant Examiner* — Alba T Rosario-Aponte
(74) *Attorney, Agent, or Firm* — Blank Rome LLP

(57) ABSTRACT

A laser cutting head uses a nozzle and gas flow to perform laser cutting or the like. The laser processing and the gas flow passes from an end of the housing. A sensor assembly affixed to the end of the housing has a first through which the laser processing passes and an orifice from which the gas flow passes. A conductive adapter affixes to the sensor assembly and has a passage through which the laser processing passes. The nozzle affixes in a receptacle in an end of the conductive adapter. A collar disposed about the adapter defining one or more gas flow passages therethrough. A cover is disposed between the sensor assembly and the collar and encloses a space communicating the gas flow from the orifice to the one or more flow passages of the collar.

21 Claims, 8 Drawing Sheets

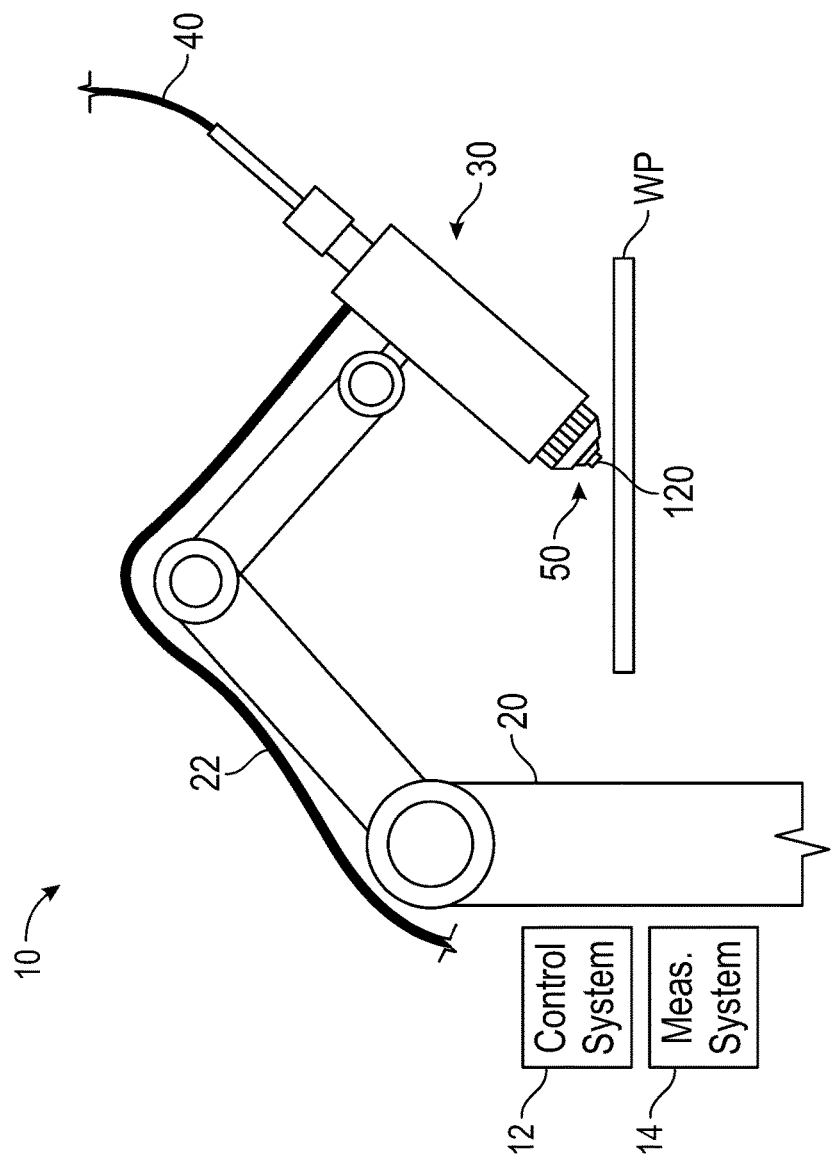
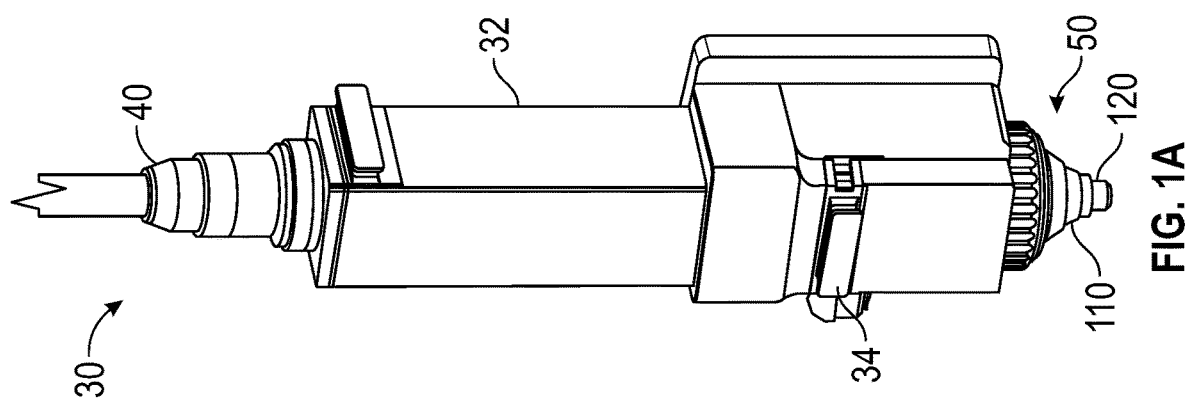
FIG. 1A
FIG. 1B

NOZZLE ADAPTER FOR LASER CUTTING HEAD

BACKGROUND OF THE DISCLOSURE

Laser cutting heads use a laser beam to perform cutting operations on sheets of different materials (typically, different types of metals and metallic compounds). The laser cutting process requires precise control of the cutting head and requires particular control of the gap between the tip of the cutting head's nozzle (where the laser beam exits) and the surface of the material being cut (referred to at times as the "workpiece"). For this purpose, the laser cutting head uses optics and sensors for controlling the cutting process.

In general terms, the laser cutting head converts the energy of a high-power laser source (typically a $CO_2$ or YAG laser) into a laser beam able to cut through (sever) a metal sheet in a precise, controlled manner. The cutting head may pass the beam through a series of lenses and may use optical fibers as the guiding path for the beam. The cutting head focuses the beam to a spot size desired for the cutting process, and the focused beam is directed through a nozzle of the cutting head and toward the sheet of material to be cut.

A companion gas (typically nitrogen or oxygen and referred to at times as a cutting or process gas) can also be delivered to the surface of the sheet along with the laser beam. The gas functions either to assist in the melting process (e.g., "oxy-fuel burning process") or to help blow molten material away from the workpiece. Although the cutting gas used during lasing process can blow material outward concentrically away from the nozzle, the nozzle needs to be positioned at a particular standoff from the workpiece to achieve proper cutting and to avoid molten material contaminating the nozzle and the cutting head.

A wide variety of laser cutting heads are manufactured for different purposes. Each type of cutting head requires the ability to adjust, control, and monitor the gap between the tip of the nozzle and the workpiece's surface. One typical system for monitoring (and controlling) this gap is based upon a measured capacitance between the nozzle tip and the workpiece (with the air gap between the two serving as the dielectric for the capacitor). To function properly, both the nozzle tip and the workpiece need to be conductive and connected to a voltage source of a measurement system.

Numerous types of nozzles are used on the laser cutting heads. These nozzles are typically composed of metal, such as copper, and have a passage therethrough for delivery of the focused laser beam and the cutting gas. Nozzles can include one or more component layers. The outward shape of the nozzle as well as any internal profiles of the through-passage can vary from nozzle to nozzle depending on the implementation and their use.

During customary use, the nozzle can become worn and contaminated, requiring replacement. During bevel cutting at acute angles, features associated with the nozzle may interfere with sensor measurements to control the standoff or gap of the nozzle from the workpiece. At very acute angles, existing arrangements of nozzles and adapters may not prevent contamination from interfering with the optics and sensing of the laser cutting head.

The subject matter of the present disclosure is directed to overcoming, or at least reducing the effects of, one or more of the problems set forth above.

SUMMARY OF THE DISCLOSURE

An apparatus disclosed herein is used to connect a nozzle to a laser cutting head. The head has a sensor assembly for capacitive sensing, an opening for communicating a laser process, and an orifice for communicating a purge gas. The apparatus comprises a conductive adapter and a cover. The conductive adapter has first and second ends and has a first passage for communicating with the laser process from the opening. The first end is affixable to the sensor assembly, and the second end is affixable to the nozzle. The conductive adapter has a collar disposed thereabout, and the collar defines one or more second passages therethrough. The cover is configured to position between the head and the collar and is configured to enclose a space communicating the purge gas from the orifice to the one or more second passages of the collar.

A laser cutting head disclosed herein uses a nozzle to deliver a laser process. The head comprises a housing, a conductive adapter, and a cover. The housing has a sensor assembly for capacitive sensing, an opening for communicating the laser process, and an orifice for communicating a purge gas. The conductive adapter has first and second ends and has a first passage for communicating with the laser beam of the opening. The first end is affixed to the sensor assembly, and the second end is affixed to the nozzle. The conductive adapter has a collar disposed thereabout, and the collar defines one or more second passages therethrough. The cover is disposed between the end of the housing and the collar and encloses a space communicating the purge gas from the orifice to the one or more flow passages of the collar.

The foregoing summary is not intended to summarize each potential embodiment or every aspect of the present disclosure.

BRIEF DESCRIPTION OF THE DRAWINGS

FIG. 1A illustrates a perspective view of a laser cutting head according to the present disclosure.

FIG. 1B illustrates a laser cutting system having a robotic arm and a laser cutting head according to the present disclosure.

DETAILED DESCRIPTION OF THE DISCLOSURE

Figure 2A:
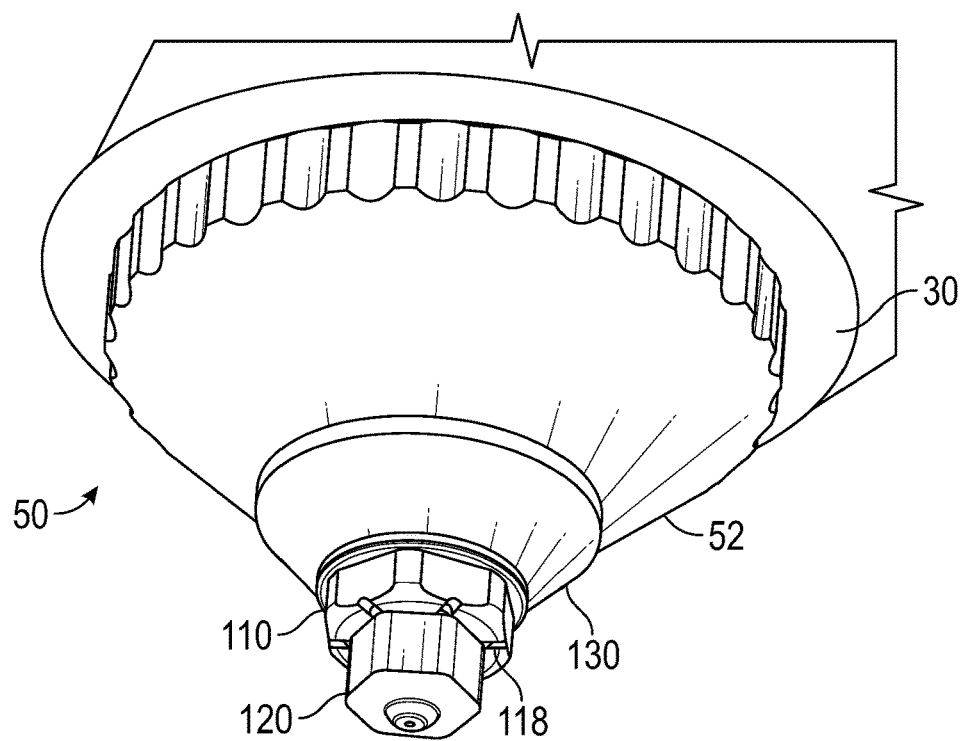
FIG. 2A illustrates a perspective view of a nozzle attachment of the present disclosure.

FIG. 1A illustrates a perspective view of a laser cutting head 30 according to the present disclosure. The laser cutting head 30 includes a housing 32 that holds various internal optics. A connection at one end of the housing 32 can couple to a laser cable 40, which conducts laser energy into the head 30. An output assembly or nozzle attachment 50 on the other end of the housing 30 has a nozzle 120 from which a laser beam is directed for cutting operations. The nozzle attachment 50 allows the focused laser beam to be emitted from the housing 32 for achieving the purposes of the lasing operation, such as welding, additive manufacture, cutting, etc. The nozzle attachment 50 also includes sensing components (not shown) for monitoring a standoff or gap of the nozzle 120 from a workpiece, as disclosed in more detail below.

To protect the internal optics inside the housing 32, the head 30 may include a cover slide cartridge 34 that holds a replaceable cover slide. This cover slide acts as a transparent window between the interior of the housing 32 (having the internal optics) and the external environment (exposed to the lasing process). Removal and replacement of the cartridge 34 can be made through an access door in the side of the head 30. The nozzle attachment 50 also protects the laser cutting head 30 in ways disclosed below.

In general, the laser cutting head 30 can be used with a gantry assembly, a robotic arm, or other apparatus so the head 30 can be moved relative to a workpiece. For example, FIG. 1B illustrates a laser cutting system 10 having the laser cutting head 30 connected to a robotic arm 20, which is operable to manipulate the head 30 relative to a workpiece WP subject to the laser processing of the present disclosure. Cabling 22 communicates control, sensing, and power to the laser cutting head 30. The cabling 22 also communicates a flow of any gases used in the lasing cutting process as described herein. The laser cable 40 delivers the lasing power to the head 30, which directs the laser beam from the nozzle attachment 50 on the end of the head 30.

In general, the laser cutting system 10 includes a control system 12 that controls operation of the various components, namely the robotic arm 20, cutting head 30, etc. The system 10 likewise includes a measurement system 14, which in the present example is used with the control system 12 to measure the standoff or gap of the cutting nozzle 120 from the workpiece WP to facilitate the cutting operation.

Depending on the shape of the workpiece WP and the cuts to be made, the head 30 can be manipulated by the robotic arm 20 at various angles and orientations relative to the workpiece WP. During the lasing process, components of the nozzle attachment 50 can sense the distance of the nozzle 120 from the workpiece WP. This is achieved using capacitance between the nozzle 120 and the workpiece WP, with the air gap between them providing the dielectric. This sensed capacitance allows the positioning of the head 30 to be controlled relative to the workpiece WP to achieve the desired lasing.

As expected, heat from the lasing process damages the nozzle 120 during use. Additionally, the lasing process can produce debris, cast off, splatter, blow back, etc. that can damage the nozzle 120 and can diminish the capacitive sensing of the head 30. Features of the nozzle attachment 50 of the present disclosure can help mitigate the damage to the nozzle 120 and can protect the capacitive sensing.

FIG. 2A illustrates a perspective view of the nozzle attachment 50 of the present disclosure. The nozzle attachment 50 includes a cap 52 attached to the head 30. An adapter 110 is connected to internal components, and the nozzle 120 is attached to the adapter 110. A cover 130 is positioned between the adapter 110 and the cap 52. To cool the nozzle 120 and to create additional shielding from debris, the adapter 110 conducts a purge gas through orifices 118 directly adjacent the nozzle 120.

Figure 2B:
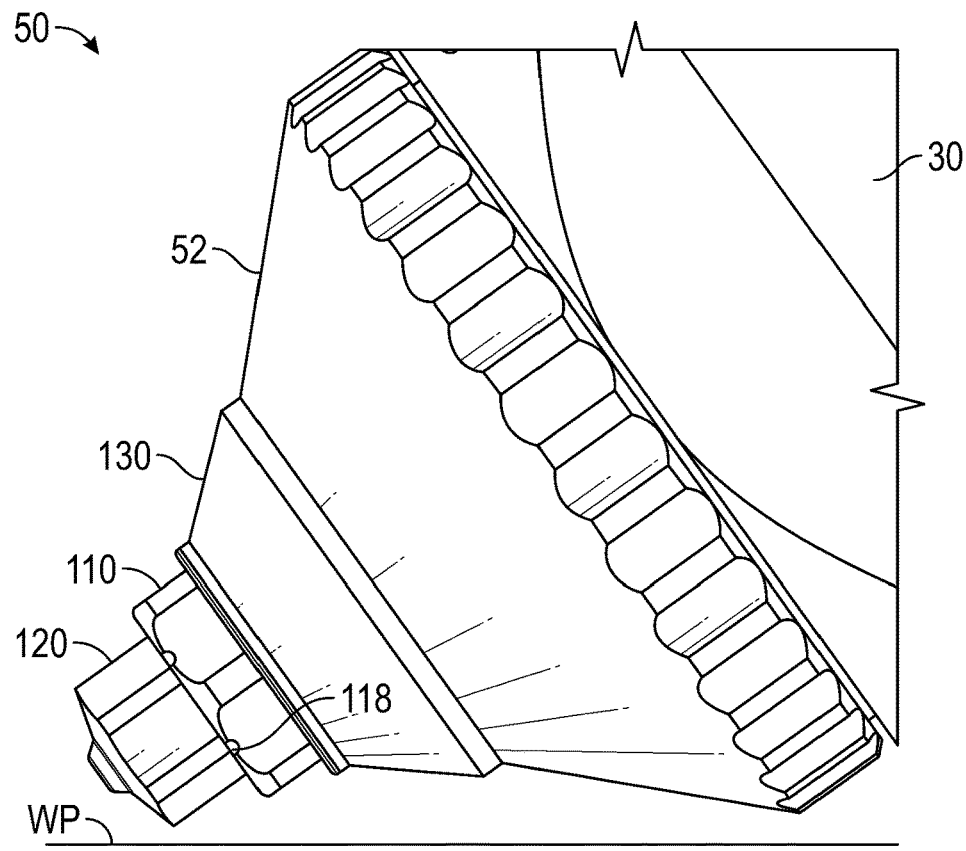
FIG. 2B illustrates an elevational view of the nozzle attachment of the present disclosure during acute angle cutting with a laser cutting head.

At very acute angles of the head 30, such as shown in FIG. 2B, components of the nozzle attachment 50 can be positioned close to the workpiece WP and can be subject to more debris and interference. To protect the components while allowing the head 30 to be used in the acute angle of operation, the nozzle attachment 50 includes the cover or girdle 130 that encloses portion of the adapter 110 for the nozzle 120. As described in more detail below, the cover 130 also encloses portions of the head's housing, which has sensing components and an orifice for the purge gas flow. The cover 130 can have a metal body with an electrical isolating shielding, such as a ceramic coating. In other configurations, the cover 130 can be made from plastic or ceramic.

Figure 2C:
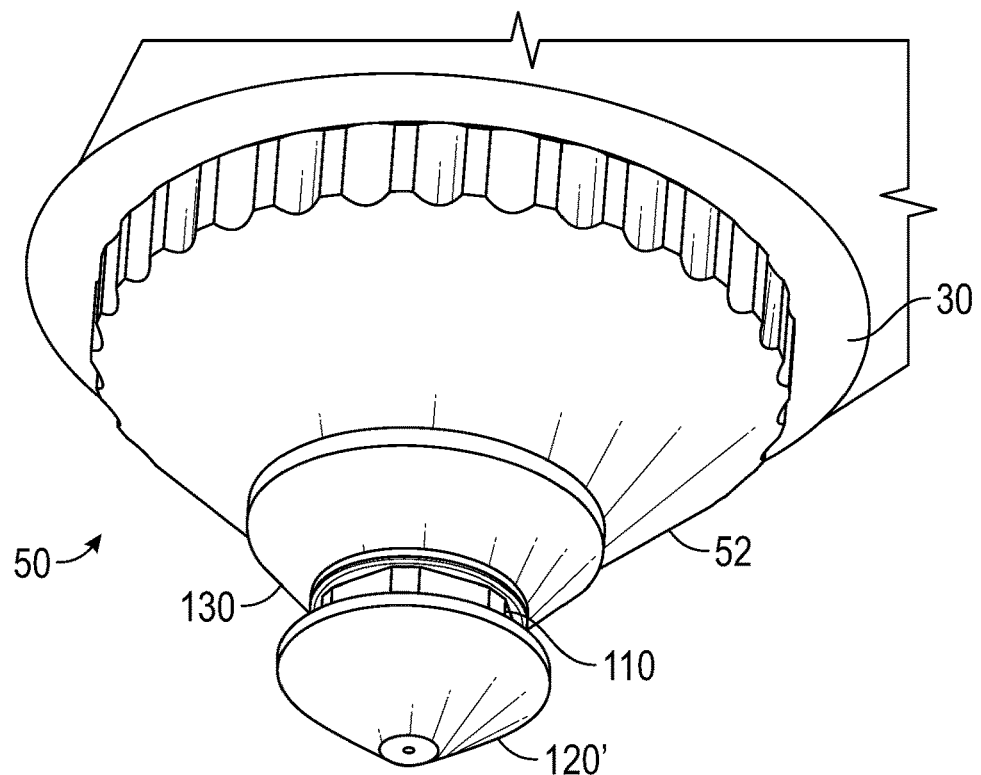
FIG. 2C illustrates a perspective view of the nozzle attachment having an alternative nozzle.

Depending on the laser process, different nozzles may be used on the nozzle attachment 50. For example, FIG. 2C shows the nozzle attachment 50 having a different, larger nozzle 120' attached to the adapter 110 than show previously. The benefit of the nozzle attachment 50 in cooling the larger nozzle 120' and creating additional shielding with purge gas can still be achieved with such a larger nozzle 120' in addition to the protection of sensing elements provided by the cover 130, adapter 110, and the like. Further details will be described much later.

Figure 2D:
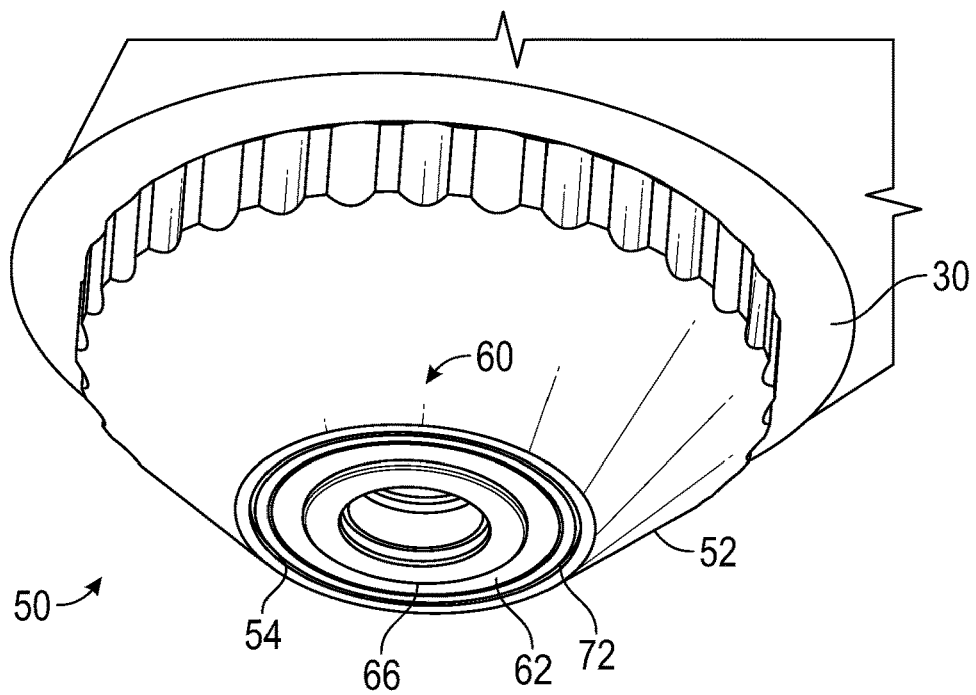
FIG. 2D illustrates a portion without nozzle and adapter in an exposed view on a laser cutting head.

Briefly, FIG. 2D shows the nozzle attachment 50 having the nozzle (120), adapter (110), and cover (130) removed to reveal internal components. Elements of the sensing assembly 60 are shown and include a ceramic body 62 having a conductive holder 66 therein. The adapter (110) threads into this conductive holder 66. The ceramic body 62 is surrounded by a shielding 72, which defines an annular gap 54 with the lip of the attachment's cap 52. This annular gap 54 acts as an orifice for purge gas as described below. As will be appreciated, the features of the nozzle attachment 50 disclosed herein can protect these internal elements of the sensing assembly 60 from debris and the like during the lasing process.

Figure 3A:
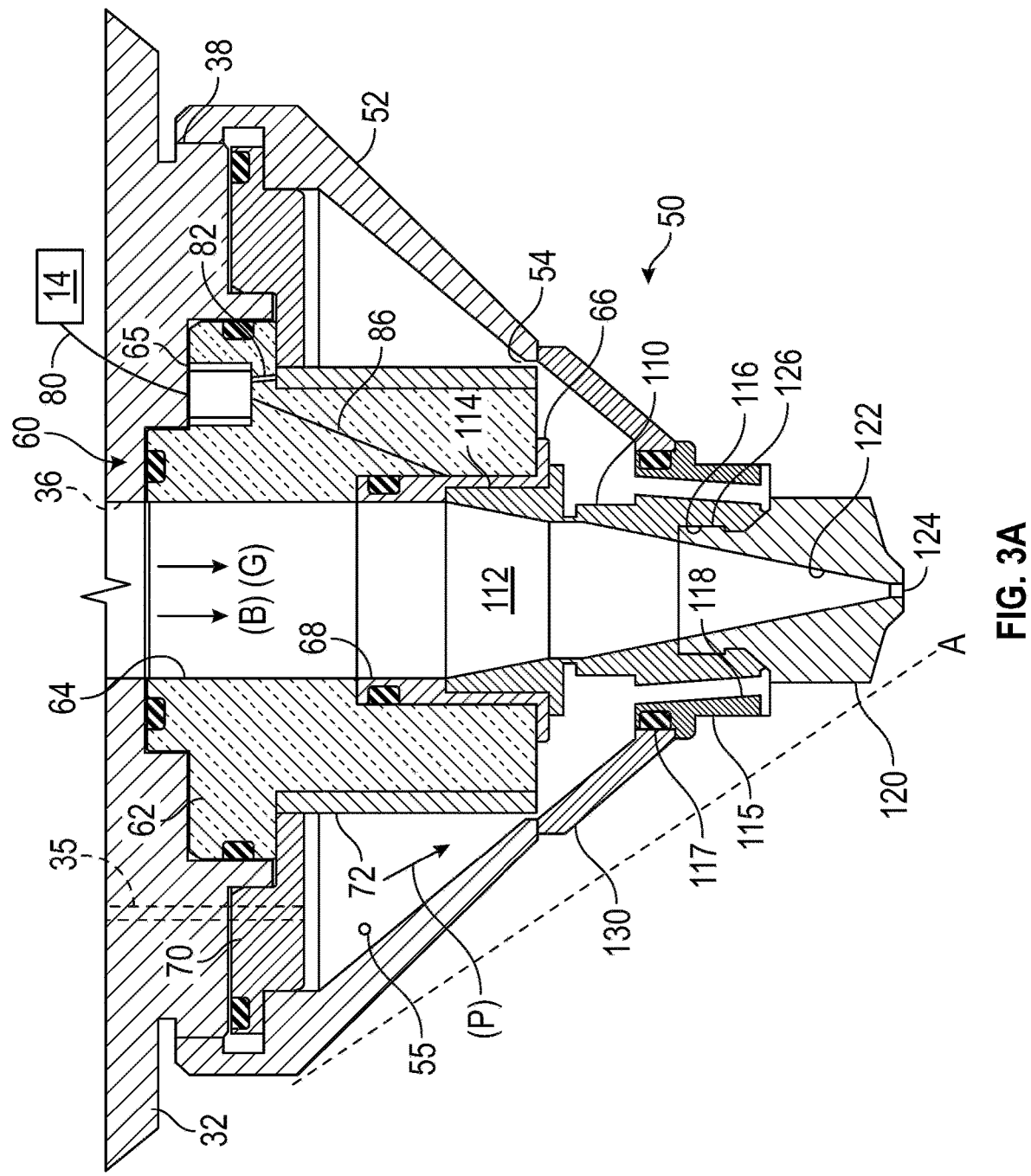
FIG. 3A illustrates a cross-sectional view of a nozzle attachment of the present disclosure on a laser cutting head.

Turning now to more details, FIG. 3A illustrates a cross-sectional view of a nozzle attachment 50 of the present disclosure on a laser cutting head 30. As noted, the head 30 is useable for laser processing with a nozzle 120. During the laser processing, a laser beam (B) and a process gas (G) is emitted from the head 30 and out the nozzle 120 on the nozzle attachment 50. Additionally, a purge gas (P) is also conducted from the head 30 and out of the nozzle attachment 50 adjacent the nozzle 120. This purge gas (P) achieves the purposes disclosed herein of (i) helping to cool the nozzle 120 and (ii) creating additional shielding about the active processing area beyond the nozzle 120.

The head 30 includes a housing 32 having an end, which can include an end plate 38 from which the laser beam (B), the process or cutting gas (G), and the purge gas (P) can pass. The laser beam (B) and the process gas (G) pass from the interior of the housing 32 through an opening 36 and then through the sensor assembly 60, while the purge gas (P) can pass from elsewhere in the housing 32 through a pathway or other opening 35, which is only schematically shown. Components of the sensor assembly 60 are affixed to the end of the housing 32, and the cap or fixture 52 covers the assembly 60 on the end of the housing 32. The conductive adapter 110 is attached to the sensor assembly 60, and the cover or girdle 130 is disposed between the sensor assembly 60 and the conductive adapter 110. Finally, the nozzle 120 is attached to the conductive adapter 110.

The cap 52 functions as an outer protective element for the sensor assembly 60, protecting the assembly 60 from exposure to other manufacturing/fabrication elements that may damage the assembly 60 or otherwise disrupt its operation. As shown in detail, the cap 52, which can be conical, has a large circumferential end that can thread to the end plate 38 fit against a retaining ring 70 used between the sensor assembly 60 and the base plate 38. A plurality of gaskets can be used to seal the arrangement against external influences, as well as to prevent intrusion of the purge gas (P).

The nozzle attachment 50 has an orifice 54 from which some of the purge gas (P) passes. For example, an annular space 54 is provided between a lip of the cap 52 and the outer edge of the sensing assembly 60. Purge gas (P) can pass out of this annular space 54 toward the end of the adapter 110 and nozzle 120 for the purposes disclosed herein.

For its part, the sensor assembly 60 has a ceramic body 62 and a conductive holder 66. The ceramic body 62 has a first passage 64 through which the laser beam (B) and any process gas (G) can pass. The conductive holder 66 is disposed in the first passage 64. The sensor assembly 60 can further include a conductive grounding shield 72 disposed about the ceramic body 62. As discussed in more detail below, the conductive holder 66 and the conductive grounded shield 72 are connected in electrical communication with a voltage and a ground respectively.

The conductive adapter 110 has first and second ends 114, 116 with a second passage 112 through which the laser beam (B) and any process gas (G) can pass. The first end 114 is configured to affix to the conductive holder 66, while the second end 116 defines a receptacle into which the nozzle 120 is affixable. For example, the first end 114 can include external threading that threads into the conductive holder 66. The receptacle 116 can define internal threading to which the nozzle 120 threads. For its part, the nozzle 120 defines a passage 122 that extends therethrough from end 126 to end 124 for passage of the laser beam (B) and process gas (P).

The conductive adapter 110 has a collar 115 disposed thereabout, and the cover 130 is disposed between the sensor assembly 60 and the collar 115. As shown, the cover 130 can have a conical shape having a large circumferential edge configured to engage the cap 52 and having a small circumferential edge configured to engage the collar 115 of the conductive adapter 110. The conductive adapter 110 can include a gasket seal 117 disposed about the collar 115 to sealably engage the cover 130.

The collar 115 defines one or more gas flow passages 118 therethrough from one side to the other for passage of some of the purge gas (P) as noted herein. In this way, the cover 130 encloses an internal space 55 communicating the purge gas (P) from the orifice 54 to the one or more flow passages 118 of the collar 115. One or more exits of the one or more flow passages 118 in the collar 115 are thereby preferably disposed directly adjacent the nozzle 120, which can increase the cooling of the nozzle 120 and prolong its operational life.

As will be appreciated, the adapter 110 with its flow passages 118 can assist in the ejection of the purge gas (F), which can effectively prevent debris from reaching components of the head 30 and the nozzle attachment 50. The adapter 110 with its flow passages 118 also controls the diffusion area and size of the purge gas' stream, which can be tailored to the cutting operation to be performed.

As will be appreciated, the cutting nozzle 120 can assist in the ejection of the cutting or process gas (G) used in the cutting operation. The size of the nozzle's aperture 124 may be selected based on the thickness of the material to be cut. The nozzle 120 helps prevent the molten material from the workpiece reaching back into the laser head 30 so that internal components of the laser head 30 can be protected. The nozzle 120 also provide a capacitance signal for use in adjusting the standoff of the lasing head 30 by its adjustment system to maintain a stable lasing operation.

In some arrangements, the internal shape of the laser head nozzle 120 can direct the flow and pressure of the process gas (G). A single layer nozzle 120 can be used in melting cutting where nitrogen may be used as an auxiliary gas to cut stainless steel and aluminum plate. A double-layer nozzle 120 can be used with oxygen as an auxiliary gas for cutting carbon steel. Typically, the nozzle 120 is conical in shape and can have a single layer or multiple layers. For example, a double-layer nozzle can have an inner core to increase the velocity of the process gas (G), which has a number of advantages. The nozzle aperture 124 and the nozzle's thickness is configured for the implementation at hand.

Turning now to details of the sensor assembly 60 used for sensing the stand-off of the nozzle 120 from a workpiece, the cylindrical ceramic body 62 is used as a base element of the sensor assembly 60. The ceramic material of the body 62 is insulative. Electrical connections between the laser cutting head nozzle 120 and an external measurement system (14) can be sintered to the outside of (or embedded within) cylindrical ceramic body 62. In this manner, the electrical connections are permanently fixed in place and prevented from moving (even in the presence of "high g" conditions) and are able to function properly in the presence of high temperatures.

These electrical connections can include: a pair of electrical conductors (wires) 82, 86, the conductive holder 66, the outer cylindrical shield 72 (also conductive), and a socket connector 65. The conductive adapter 110 and the nozzle 120 engage with conductive holder 68. Together, these direct the laser beam (B) and any process gas (G) out of the cutting head 30 toward the workpiece.

The socket connector 65 can be a coaxial cable connector, including a central conductor and an outer ground conductor (with insulating material disposed between them). One wire 86 is used to conduct an electrical signal (voltage) along the central conductor to the conductive holder 66, which is itself formed of a conductive material (for example, stainless steel). In assembling the laser cutting head 30, the adapter 110 is threaded into the conductive holder 66 (in particular, screwed in place by the mating threads), and the nozzle 120 is threaded into the adapter 110. As a result, the nozzle 120 is electrified by virtue of the connections established through wire 86 and threaded holder 66.

The other wire 82 is positioned within the ceramic body 62 to create the conduction path between for the outer ground or shield 72. This outer shield 72 takes the form of a sleeve that is designed to slip over and contact the outer surface of cylindrical ceramic body 62. The shield 72 is permanently fixed in place around ceramic body 62 and is preferably formed of stainless steel.

The combination of the conductive holder 66, the ceramic body 62, and the shield 72 provides the connection arrangement for energizing the attached nozzle 120, minimizing problems with internal interference and parasitic induction that would otherwise affect the capacitive measurements performed by the associated measurement system 14. In addition to the cap 52, the cover 130 used in conjunction with the collar 115 and the seal 117 of the adapter 110 protects these components of the sensing assembly 60 during operations, while still allowing the head 30 to be used at small acute angles as noted herein.

As already noted, for example, the conical cap 52 having a large circumferential end attached to the end 38 of the housing 32 and having a small circumferential end defining the annular gap 54 about the ceramic body 62 for the passage of the purge gas (P). A circumference of the collar 115 of the conductive adapter 110 lies within a conical angle (A) extending from a tip of the nozzle 120 to the large circumferential end of the conical cap 52. This configuration allows the head 30 to be positioned at small acute angles relative to a workpiece during lasing operations, as previously noted with respect to FIG. 2B.

As can be seen, should any molten debris or the like be able to reach the annular gap 54, the contamination can obstruct the flow of purge gas (P) from the head 30. Moreover, any molten debris or the other contamination reaching the sensor assembly 60 may interrupt its sensing capabilities. To that end, the cover 130, the collar 115 of the adapter 110, the seal 117, and the other features protect the gap 54 and the sensor assembly 60. Moreover, the directed purge gas (P) can actively cool the nozzle 120, which prevents overheating/wear. The purge gas (P) can also be used as a curtain (shielding) for the cutting gas (G) stream.

Figure 3B:
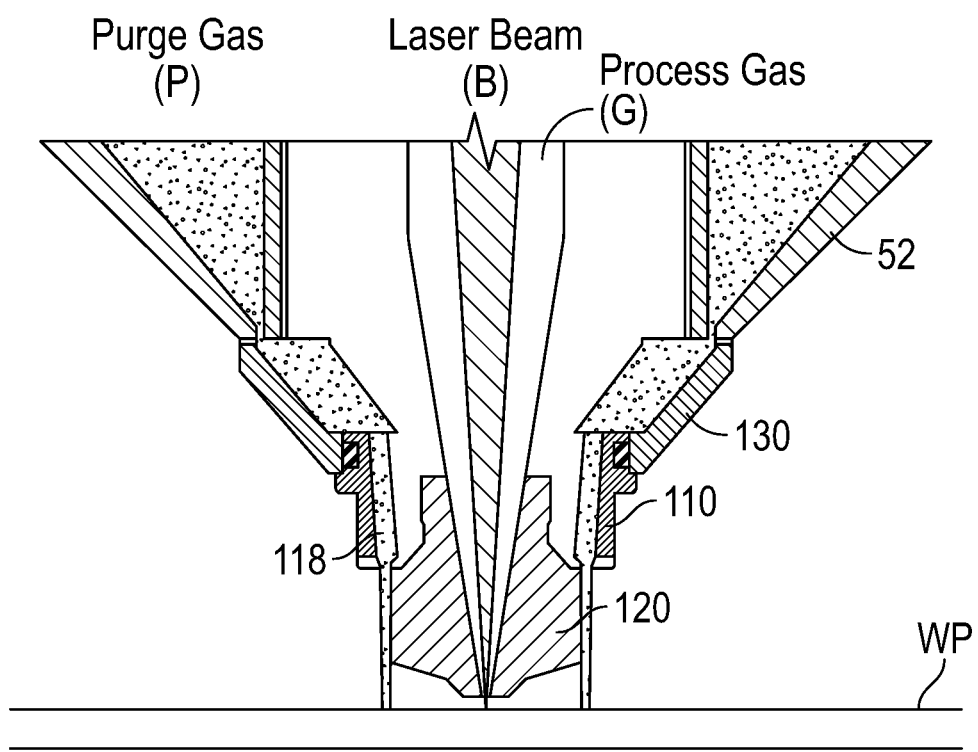
FIG. 3B illustrates a schematic view showing the laser beam, process gas, and purge gas relative to components of the nozzle attachment of FIG. 3A.

For instance, FIG. 3B illustrates a schematic view showing the laser beam (B), process gas (G), and purge gas (P) relative to components of the nozzle attachment 50 of FIG. 3A. Both gas streams (P, G) are independently adjustable in terms of flow, pressure and type of gas. This gives operators the ability to create an inert gas curtain from the purge gas (P) around any oxygen-based or other process gas (G). Additionally, the angle of the purge gas (P) stream can be adjusted to the required needs of the cutting operation. For example, the purge gas (P) stream can be angled towards the work piece/material surface so that the purge gas (P) can act as a process jet, cooling down/deflecting process emissions away from the head 30 and the gantry 20. The purge gas (P), as a separately supplied gas, aims at protecting the sensor measurement system against process-based contamination, such as spatter particles, fumes, and general dirt. Ultimately, the directed application of the purge gas (P) towards the process can be used as an active cooling media of the nozzle 120 and/or as an additionally process jet.

Figure 4A:
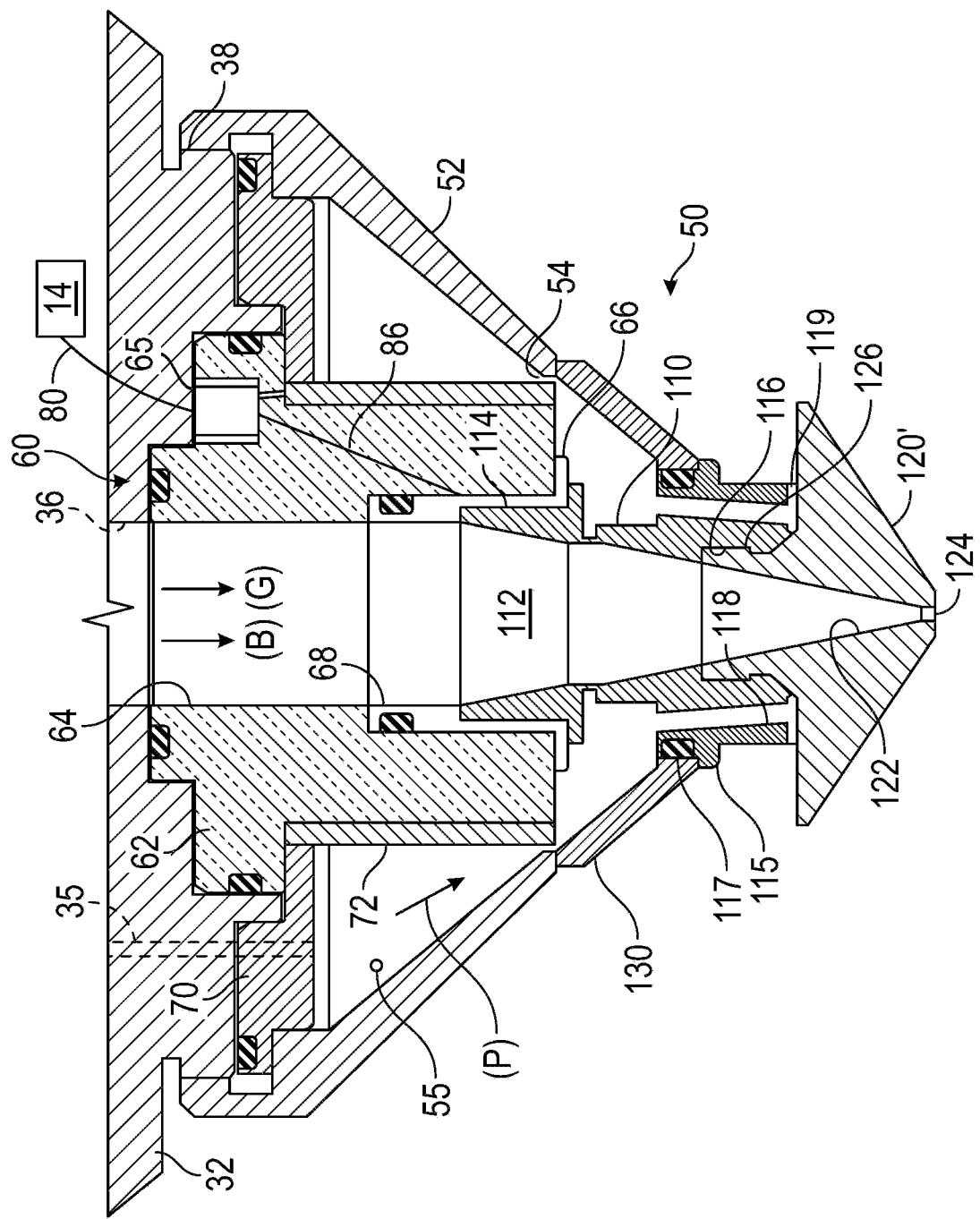
FIG. 4A illustrates a cross-sectional view of the nozzle attachment of the present disclosure having a different nozzle.

Turning to another configuration, FIG. 4A illustrates a cross-sectional view of the nozzle attachment 50 having a larger nozzle 120', as mentioned previously. Similar components as in the other configurations have the same reference numerals and are not described again, but their details are incorporated herein.

As shown, the nozzle 120' extends beyond the collar 115 of the adapter 110. To allow the purge gas (P) to flow from the flow passages 118, side chamfers 119 can be defined in the side of the collar 115. The purge gas (P) from the flow passages 118 can escape outside the sides of the adapter 110 and can still achieve the purposes of cooling the nozzle 120' and creating additional shielding.

Figure 4B:
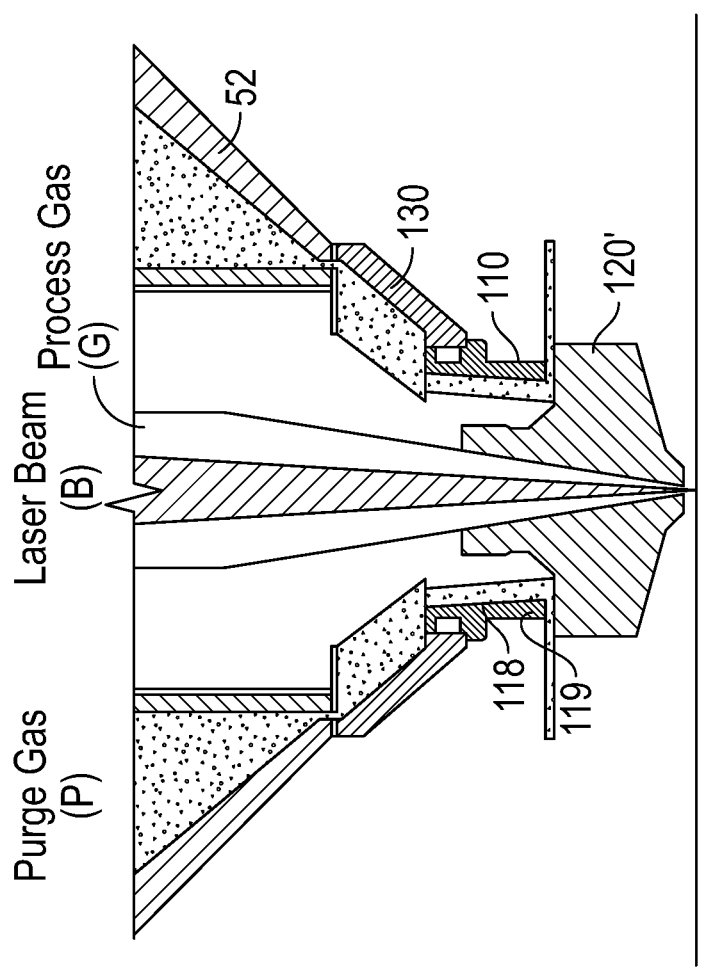
FIG. 4B illustrates a schematic view showing the laser beam, process gas, and purge gas relative to components of the nozzle attachment of FIG. 4A.

For example, FIG. 4B illustrates a schematic view showing the laser beam (B), process gas (G), and purge gas (P) relative to components of the nozzle attachment 50 of FIG. 3B. The nozzle adapter 110 cools down the nozzle 120' by directing the purge gas (P) flow to the nozzle 120'. Additionally, the purge gas (P) can act like a jacket around the process gas (G), This function depends on the design of the nozzle 120' and the nozzle adapter 110. Here, the nozzle adapter 110 can produce a horizontal cross-jet of the purge gas (P) to prevent contamination. Yet, the purge gas (P) is still capable of cooling the nozzle 120).

Figure 5:
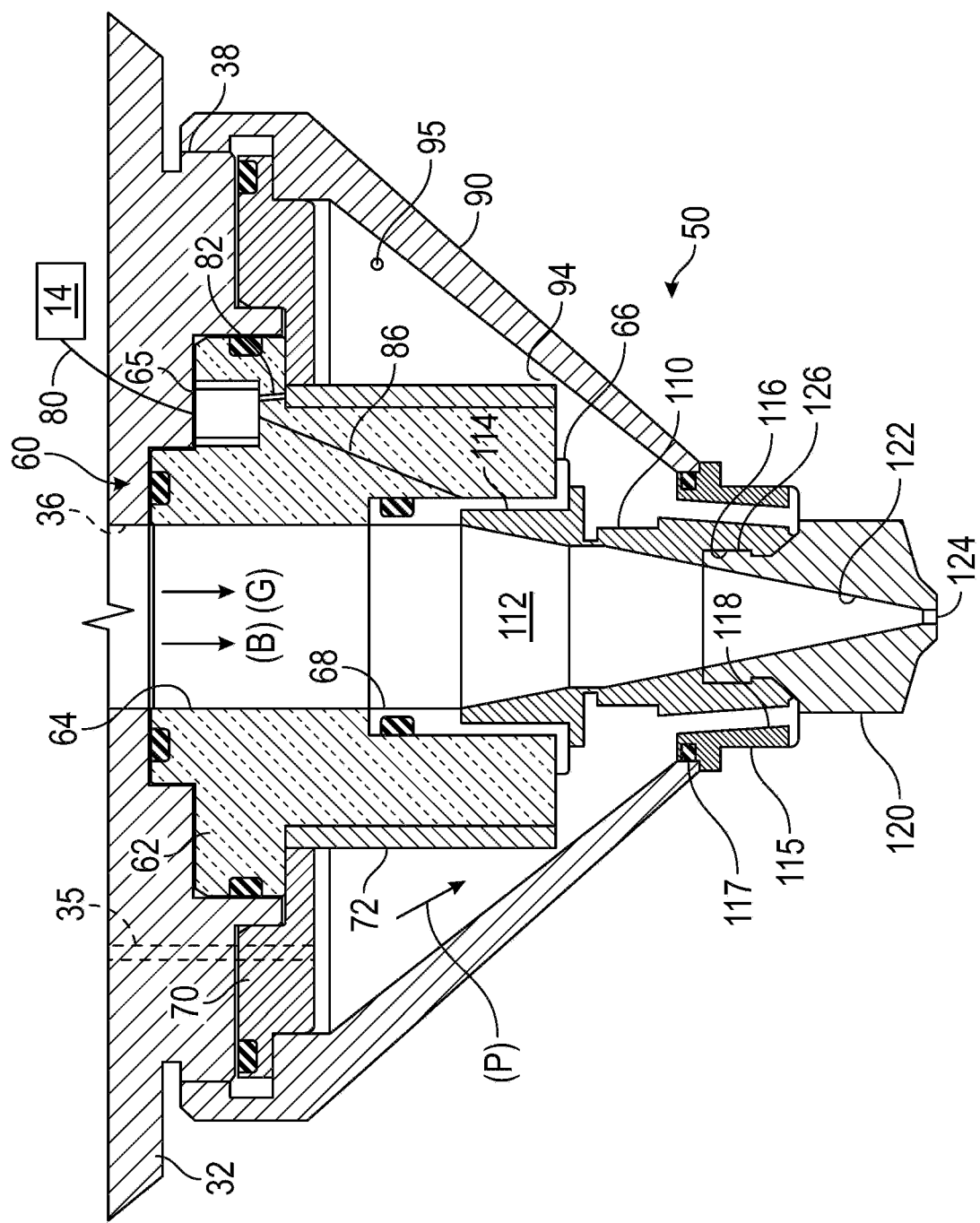
FIG. 5 illustrates a cross-sectional view of another nozzle attachment of the present disclosure on a laser cutting head.

An alternative configuration of the nozzle attachment 50 is shown in FIG. 5. Similar components as in the other configuration have the same reference numerals, but their details are incorporated herein. In this arrangement, the separate features of the conical cap and the cover from FIGS. 3A & 4A are integrated together into a unitary cover 90, which encloses a space 95 and defines the orifice 94 for the purge gas (P) to reach the ports 118 in the adaptor's collar 115.

As disclosed herein, the nozzle attachment 50 can relieve problems during bevel cutting operations that may be encountered during operation. The nozzle attachment 50 can prevent contamination from getting inside the sensor assembly 60 and can produce the cooling effect with the purge gas (P) for cooling down the nozzle 120. The adapter 110 and cover 130 are configured to not impact the capacitive sensor assembly 60 and system (14) of the cutting head 30. Moreover, the attachment 50 has a modular design so the attachment 50 can be used with a number of different nozzle types.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An apparatus configured to connect a nozzle to a laser cutting head, the laser cutting head comprising a sensor assembly configured to sense a capacitance between the nozzle and a workpiece; a first opening for communicating at least one of a laser or a process gas; and a second opening for communicating a purge gas, wherein the sensor assembly includes a conductive holder and a grounding shield, the apparatus comprising:
a conductive adapter configured to electrically connect the nozzle to the conductive holder, the conductive adapter comprising:
a first end configured to fix to the sensor assembly;
a second end configured to fix to the nozzle; and
a collar, wherein the conductive adapter defines:
a first passage configured to communicate with the first opening,
a second passage inlet,
a second passage outlet, and
a second passage with an outer boundary defined by an inner surface of the collar that extends continuously from the second passage inlet to the second passage outlet and with an inner boundary defined by an outer surface of the second end of the conductive adapter that extends continuously from the second passage inlet to the second passage outlet;
a cap; and
an electrically insulative cover, wherein:
the cap and the electrically insulative cover are configured to be positioned between the laser cutting head and the collar and are configured to enclose a space that is configured to communicate the purge gas from the second opening to the second passage, the space is defined between the cap and the grounding shield and between the electrically insulative cover and the conductive adapter, the second passage inlet is configured to receive the purge gas from the space, and the second passage outlet is configured to receive the purge gas from the second passage, via the second passage inlet, and is configured to eject the purge gas directly to an external environment that includes the workpiece.

2. The apparatus of claim 1, wherein the second end of the conductive adapter comprises a receptacle configured to fix to the nozzle.

3. The apparatus of claim 2, wherein the receptacle comprises internal threading configured to thread with the nozzle.

4. The apparatus of claim 1, wherein the first end of the conductive adapter comprises external threading configured to thread with the conductive holder.

5. The apparatus of claim 1, wherein the electrically insulative cover is at least made of at least one of plastic, metal, or ceramic.

6. The apparatus of claim 1, wherein the conductive adapter comprises a gasket seal disposed about the collar and configured to sealably engage a lip of the electrically insulative cover.

7. The apparatus of claim 1, wherein:
the electrically insulative cover is cone shaped,
the cap comprises a first circumferential edge configured to engage the sensor assembly, and
the electrically insulative cover comprises a second circumferential edge that is smaller than the first circumferential edge and that is configured to engage the collar of the conductive adapter.

8. The apparatus of claim 1, wherein the second passage outlet is directly adjacent to the nozzle.

9. The apparatus of claim 1, wherein the electrically insulative cover is replaceable.

10. A laser cutting head comprising:
a nozzle;
a housing comprising:
    a first opening for communicating at least one of a laser or a process gas; and
    a second opening for communicating a purge gas;
a sensor assembly within the housing, the sensor assembly being configured to sense a capacitance between the nozzle and a workpiece, the sensor assembly comprising a conductive holder and a grounding shield;
a conductive adapter that electrically connects the nozzle to the conducive holder, the conductive adapter comprising:
    a first end fixed to the sensor assembly;
    a second end fixed to the nozzle; and
    a collar, wherein the conductive adapter defines:
        a first passage in communication with the first opening,
        a second passage inlet,
        a second passage outlet, and
        a second passage with an outer boundary defined by an inner surface of the collar that extends continuously from the second passage inlet to the second passage outlet and with an inner boundary defined by an outer surface of the second end of the conductive adapter that extends continuously from the second passage inlet to the second passage outlet;
a cap; and
an electrically insulative cover, wherein:
the cap and the electrically insulative cover are positioned between the housing and the collar and enclose a space communicating the purge gas from the second opening to the second passage,
the space is defined between the cap and the grounding shield and between the electrically insulative cover and the conductive adapter,
the second passage inlet is configured to receive the purge gas from the space, and
the second passage outlet is configured to receive the purge gas from the second passage, via the second passage inlet, and is configured to eject the purge gas directly to an external environment that includes the workpiece.

11. The laser cutting head of claim 10, wherein the sensor assembly comprises a ceramic body comprising the first opening for communicating the at least one of the laser or the process gas, wherein the conductive holder is disposed in the first opening of the ceramic body.

12. The laser cutting head of claim 11, wherein:
the grounding shield is conductive and is disposed about the ceramic body, and
the conductive holder and the grounding shield are connected in electrical communication.

13. The laser cutting head of claim 11, wherein the first end of the conductive adapter comprises external threading threaded with the conductive holder.

14. The laser cutting head of claim 10, wherein the second end of the conductive adapter comprises a receptacle into which the nozzle is affixed.

15. The laser cutting head of claim 14, wherein the receptacle comprises internal threading threaded with the nozzle.

16. The laser cutting head of claim 10, wherein the electrically insulative cover is at least made of at least one of plastic, metal, or ceramic.

17. The laser cutting head of claim 10, wherein the conductive adapter comprises a gasket seal disposed about the collar and sealably engaging the electrically insulative cover.

18. The laser cutting head of claim 10, wherein:
the electrically insulative cover is cone shaped,
the cap comprises a first circumferential edge engaged with the sensor assembly, and
the electrically insulative cover comprises a second circumferential edge that is smaller than the first circumferential edge and that is engaged with the collar of the conductive adapter.

19. The laser cutting head of claim 10, wherein the second passage outlet is directly adjacent to the nozzle.

20. The laser cutting head of claim 11, wherein:
the cap is cone shaped,
the cap comprises a first circumferential end attached to the housing and a second circumferential end that is smaller than the first circumferential end and that defines an annular gap about the ceramic body, and
a circumference of the conductive adapter lies within a conical angle extending from the first circumferential end of the cap toward a tip of the nozzle.

21. The laser cutting head of claim 10, wherein the electrically insulative cover is replaceable.

\* \* \* \* \*